(12) United States Patent
Kroemke et al.

(10) Patent No.: US 8,868,299 B2
(45) Date of Patent: Oct. 21, 2014

(54) METHOD AND DEVICE FOR ACTUATING A CLOSING ELEMENT OF A VEHICLE

(75) Inventors: Carsten Kroemke, Braunschweig (DE); Bernd Ette, Wolfsburg (DE)

(73) Assignee: Volkswagen AG, Wolfsburg (DE)

( * ) Notice: Subject to any disclaimer, the term of this patent is extended or adjusted under 35 U.S.C. 154(b) by 375 days.

(21) Appl. No.: 13/376,041

(22) PCT Filed: May 28, 2010

(86) PCT No.: PCT/EP2010/003274
§ 371 (c)(1),
(2), (4) Date: Mar. 9, 2012

(87) PCT Pub. No.: WO2010/139439
PCT Pub. Date: Dec. 9, 2010

(65) Prior Publication Data
US 2012/0158253 A1    Jun. 21, 2012

(30) Foreign Application Priority Data

Jun. 2, 2009 (DE) .......................... 10 2009 023 594

(51) Int. Cl.
| | |
|---|---|
| *B60R 22/00* | (2006.01) |
| *B60R 25/20* | (2013.01) |
| *E05F 15/20* | (2006.01) |
| G07C 9/00 | (2006.01) |
| E05F 15/00 | (2006.01) |

(52) U.S. Cl.
CPC ............ *E05F 15/20* (2013.01); *G07C 9/00309* (2013.01); *E05Y 2900/546* (2013.01); *B60R 25/2054* (2013.01); *E05Y 2400/858* (2013.01); *E05Y 2400/852* (2013.01); *E05F 15/0073* (2013.01); *E05F 15/0026* (2013.01)

USPC .............................................. 701/49

(58) Field of Classification Search
None
See application file for complete search history.

(56) References Cited

U.S. PATENT DOCUMENTS

| 5,929,769 A | 7/1999 | Garnault ...................... 340/5.61 |
| 6,098,432 A | 8/2000 | Spies ............................. 70/237 |

(Continued)

FOREIGN PATENT DOCUMENTS

| CN | 1224481 A | 7/1999 | ............. B62D 25/12 |
| DE | 29623461 U1 | 7/1998 | ............. B60R 25/00 |

(Continued)

OTHER PUBLICATIONS

International PCT Search Report and Written Opinion, PCT/EP2010/003274, 9 pages, Oct. 6, 2010.

*Primary Examiner* — Thomas Tarcza
*Assistant Examiner* — Adam Alharbi
(74) *Attorney, Agent, or Firm* — King & Spalding L.L.P.

(57) ABSTRACT

In a method and a device (12) for automatically actuating a closing element (1) of a vehicle (10), the closing element is actuated when a movement of an object corresponding to a predefined movement profile is registered in an area surrounding the vehicle and when at the same time a vehicle key assigned to the vehicle is registered. In this case, it is firstly possible for the movement of the object in the area around the vehicle (10) to be monitored by the interaction between a capacitive sensor (5) and an optical sensor (4, 7), or for the movement profile first to have an approach to the vehicle (10) and a subsequent movement away from the vehicle (10), so that the closing element (1) is only actuated after the movement away from the vehicle (10).

15 Claims, 3 Drawing Sheets

(56) References Cited

U.S. PATENT DOCUMENTS

| | | | |
|---|---|---|---|
| 6,676,186 B2 | 1/2004 | Greif | 296/50 |
| 8,107,919 B2 * | 1/2012 | Fujikawa | 455/318 |
| 2001/0026213 A1 * | 10/2001 | Onuma et al. | 340/5.65 |
| 2001/0054952 A1 | 12/2001 | Desai et al. | 340/5.72 |
| 2005/0168322 A1 * | 8/2005 | Appenrodt et al. | 340/5.72 |
| 2006/0092278 A1 | 5/2006 | Kondo et al. | 348/152 |
| 2008/0068145 A1 | 3/2008 | Weghaus et al. | 340/426.25 |
| 2008/0129446 A1 * | 6/2008 | Vader | 340/5.6 |
| 2011/0242303 A1 | 10/2011 | Giraud et al. | 348/77 |
| 2011/0315848 A1 * | 12/2011 | Risse et al. | 248/475.1 |

FOREIGN PATENT DOCUMENTS

| | | | | |
|---|---|---|---|---|
| DE | 10129177 A1 | 1/2002 | | E05B 65/36 |
| DE | 10038803 A1 | 2/2002 | | B60R 25/00 |
| DE | 10105060 A1 | 8/2002 | | B60R 25/00 |
| DE | 10106400 A1 | 8/2002 | | G07C 9/00 |
| DE | 10361115 A1 | 7/2005 | | B60R 25/00 |
| DE | 102004041709 B3 | 10/2005 | | E05F 15/20 |
| DE | 102005051624 A1 | 7/2006 | | B60R 25/00 |
| DE | 102005032402 B3 | 9/2006 | | B60R 16/02 |
| DE | 102006015930 A1 | 12/2006 | | B60R 25/24 |
| DE | 202005020140 U1 | 5/2007 | | B60R 25/24 |
| DE | 102006037237 A1 | 2/2008 | | B60R 25/20 |
| DE | 102007002700 A1 | 7/2008 | | E05B 65/26 |
| DE | 102007041288 A1 | 3/2009 | | B60R 1/00 |
| EP | 0770749 A2 | 5/1997 | | B60R 25/00 |
| EP | 1902912 A1 | 3/2008 | | B60R 25/20 |
| FR | 2920172 | 2/2009 | | E05B 65/36 |
| KR | 1020000011427 A | 2/2000 | | B60J 5/10 |
| KR | 1020040050981 A | 6/2004 | | B62D 25/12 |
| KR | 100892511 B1 | 4/2009 | | B60J 5/10 |
| WO | 2009/024602 A1 | 2/2009 | | E05B 65/20 |
| WO | 2010/139439 A1 | 12/2010 | | B60R 25/20 |

* cited by examiner

METHOD AND DEVICE FOR ACTUATING A CLOSING ELEMENT OF A VEHICLE

CROSS-REFERENCE TO RELATED APPLICATIONS

This application is a U.S. National Stage Application of International Application No. PCT/EP2010/003274 filed May 28, 2010, which designates the United States of America, and claims priority to German Application No. 10 2009 023 594.9 filed Jun. 2, 2009. The contents of which are hereby incorporated by reference in their entirety.

TECHNICAL FIELD

The present invention relates to a method and a device for contactless actuating a closing element and a door or lid, respectively, in particular a rear lid of a vehicle.

BACKGROUND

DE 10 2004 041 709 B3 discloses a vehicle comprising a lid automatically opening on the basis of an opening command, wherein the opening command is carried out without a manual actuation of a unlocking/locking mechanism.

DE 10 2006 015 930 A1 discloses a method for automatically opening an element of a motor vehicle. Here, the element is opened when a portable encoder at least carries out a predefined change of position authorizing for automatically opening the element.

DE 10 2006 037 237 A1 describes a method for controlling a door of a vehicle, wherein a movement pattern of a mobile identification sensor is registered relative to the vehicle.

The methods for contactless opening or closing of doors or lids according to prior art on the one hand work inefficient or imprecise and on the other hand cannot ensure that the opening or closing lid or door does not lead to an injury with the authorized operator.

SUMMARY

According to various embodiments, an automatic actuation of a closing element of a vehicle can be implemented, which constitutes an advancement with respect to the problems according to prior art.

According to an embodiment, in a method for automatically actuating a closing element of a vehicle, wherein the closing element is actuated automatically, when a movement of an object in an area surrounding the vehicle corresponding to a predefined movement profile is registered, and when at the same time a vehicle key assigned to the vehicle is registered, the movement of the object in the area surrounding the vehicle is monitored by the coaction of at least one capacitive sensor and at least one optical sensor.

According to a further embodiment, the least one optical sensor may only then be activated, when the at least one capacitive sensor has registered a part of the movement corresponding to the predefined movement profile and the key assigned to the vehicle has been registered. According to a further embodiment, the closing element may only be actuated when it is registered by means of the at least one optical sensor that no object is located in an area which is covered by the closing element during opening or closing.

According to another embodiment, in a method for automatically actuating a closing element of a vehicle, wherein the closing element is actuated automatically, when a movement of an object in an area surrounding the vehicle corresponding to a predefined movement profile is registered, and when at the same time a vehicle key assigned to the vehicle is registered, the movement profile firstly comprises an approach to the vehicle and a subsequent movement away from the vehicle, such that the closing element only is activated after the movement away from the vehicle.

According to a further embodiment of the above method, the approach is registered, when the object enters a registration area of at least one sensor, and that the movement away is registered, when the object leaves the registration area of the at least one sensor.

According to a further embodiment of any of the above methods, the closing element can be a door or a lid of the vehicle, and that the actuation of the closing element implies an opening of the closing element, when the closing element is closed, and implies a closing of the closing element, when the closing element is open.

According to yet another embodiment, a device for actuating a closing element of a vehicle, wherein the device comprises a mechanism for actuating the closing element, a control unit, at least one capacitive sensor and at least one optical sensor, can be configured such that the control unit actuates das closing element by means of the mechanism, when the device registers a movement of an object in an area surrounding the vehicle corresponding to a predefined movement profile by means of a coaction of the at least one capacitive sensor and the at least one optical sensor and the control unit at the same time registers a vehicle key assigned to the vehicle.

According to a further embodiment of the device, the device may comprise a license plate illumination of the vehicle and the at least one capacitive sensor and/or the at least one optical sensor are integrated into the license plate illumination. According to a further embodiment of the device, the device may comprise sensor electronics by means of which the at least one capacitive sensor and the at least one optical sensor are activated, and the sensor electronics also is configured for activating the license plate illumination. According to a further embodiment of the device, the closing element can be a rear lid of the vehicle, the at least one optical sensor is configured such that the optical sensor registers an area behind the vehicle when the rear lid is closed and the at least one optical sensor registers an area below the rear lid when the rear lid is open. According to a further embodiment of the device, the device for can be configured to carry out one of the above mentioned methods.

According to a further embodiment of the device, the device may comprise a mechanism for actuating the closing element, a control unit and at least one sensor, wherein the device can be configured such that the control unit actuates the closing element by means of the mechanism when the device registers a movement of an object in an area surrounding the vehicle corresponding to a predefined movement profile by means of the at least one sensor and the control unit at the same time registers a vehicle key assigned to the vehicle, wherein the movement profile firstly comprises an approach to the vehicle and a subsequent movement away from the vehicle such that the device actuates the closing element only after the movement of the object away from the vehicle. According to a further embodiment of the device, the at least one sensor may comprise a capacitive sensor and an optical sensor and the device is configured such that the device registers the movement by means of a coaction of the capacitive sensor and the optical sensor. According to a further embodiment of the device, the device can be configured to carry out one of the above mentioned methods.

According to yet another embodiment, a vehicle may comprise a device as stated above.

BRIEF DESCRIPTION OF THE DRAWINGS

In the following the present invention is described in detail with respect to embodiments and with reference to the drawings.

Figure 2:
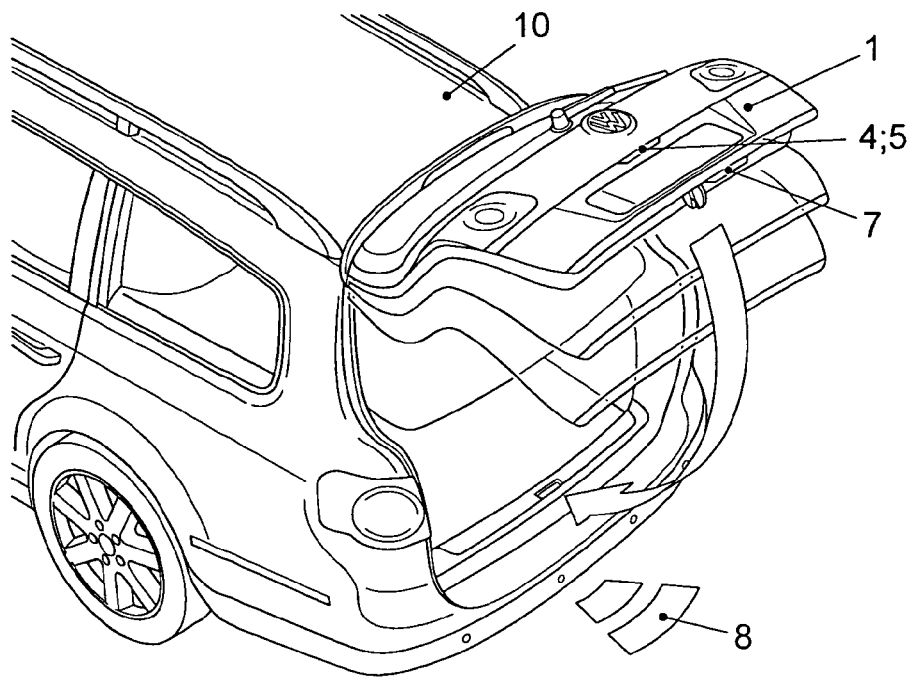
FIG. 2 shows a further embodiment of a vehicle comprising an automatically actuated rear lid.
Figure 3:
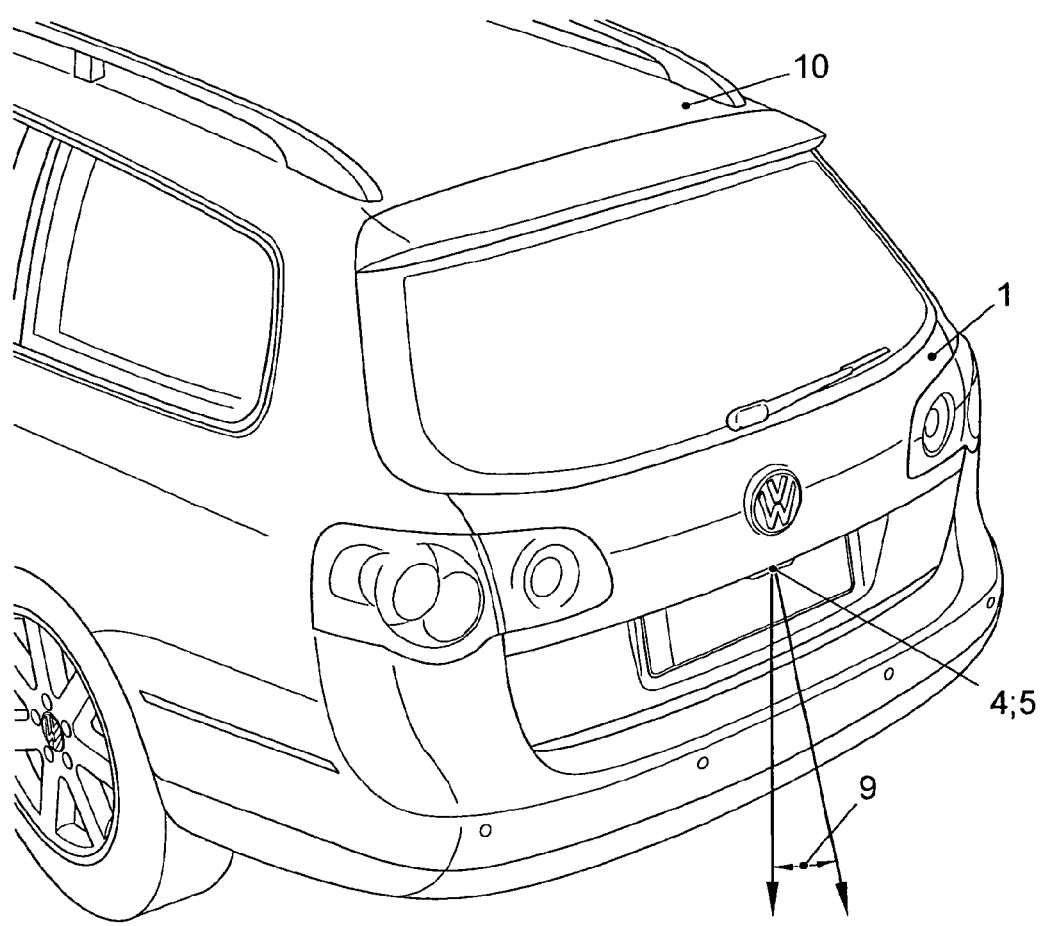

Depicted in FIG. 3 is the vehicle shown in FIG. 2 with closed rear lid.

Figure 4:
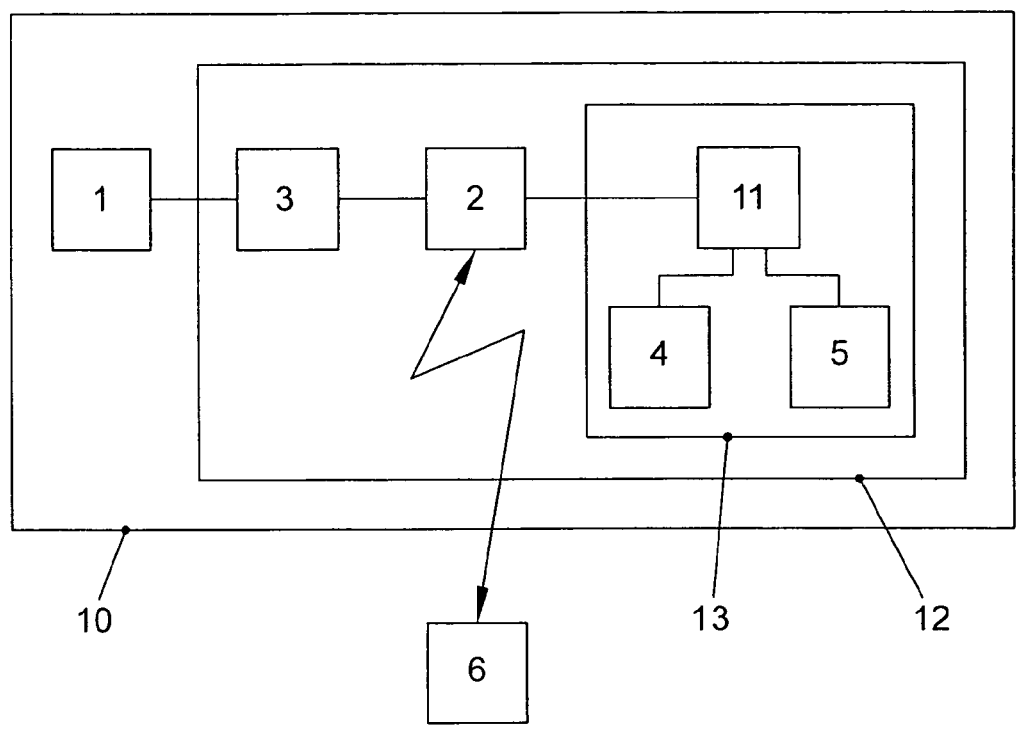

FIG. 4 schematically shows a vehicle comprising a device according to various embodiments.

DETAILED DESCRIPTION

According to various embodiments, a method for an automatic actuation of a closing element of a vehicle is provided. In doing so, the closing element is actuated automatically, i.e. opened when it is closed, or closed when it is open when the following two prerequisites are fulfilled:

A movement of an object in an area surrounding the vehicle corresponding to a predefined movement profile is registered.

At the same time at which the movement is registered a vehicle key assigned to the vehicle is registered.

In doing so, the movement of the object in the area surrounding the vehicle is monitored or registered in that at least one capacitive sensor cooperates with at least one optical sensor.

According to various embodiments, a closing element in particular is a lid (for example a rear lid) or a door of the vehicle. Understood to mean an area surrounding the vehicle is an area outside of the vehicle, which has an expansion so that an object, which is located outside of that area, assuredly is not touched by a closing element of the vehicle, which is opening or closing. Thus, the area surrounding the vehicle has an area, which, as a general rule, shows a distance of not more than 2 m from the vehicle or the closing element, which is to be actuated, respectively. An object comprises a person as well as also a limb of a person, as for example a foot, but also comprises artifacts, such as a stick. Understood to mean a movement profile is a characteristic movement pattern, which is composed of one or more movements. In doing so, in particular understood as a movement is a linear movement, which is defined by the direction of movement and by a minimum length (for example 10 cm) of the movement in the direction of movement. An example of a movement profile consists of a forward movement and a backward movement, wherein the direction of movement of the forward movement is substantially anti-parallel with respect to the direction of movement of the backward movement. However, also understood as a movement may be a movement of an object from a position outside of an area (for example a registering area of a sensor) to a position inside of that area or from a position inside an area to a position outside of that area.

According to various embodiments, understood to mean a coaction of the at least one capacitive sensor and the at least one optical sensor is that the automatic actuation of the closing element only then is carried out when the at least one capacitive sensor as well as the at least one optical sensor register at least a part of the movement of the object corresponding to the predefined movement profile. For example, it is feasible that the at least one optical sensor only is activated when the at least one capacitive sensor has registered a part of the movement corresponding to the predefined movement profile and the key assigned to the vehicle has been registered.

As the at least one optical sensor only then is activated by the at least one capacitive sensor when the at least one capacitive sensor already has registered a part of the movement corresponding to the predefined movement profile and at the same time the key assigned to the vehicle was registered, the zero signal current consumption of the at least one optical sensor is significantly lower than when the at least one optical sensor would have to be active constantly in order to also register the first part of the movement corresponding to the predefined movement profile.

Therefore, advantageously an optical sensor may be used, which may have a larger registration area as compared to a capacitive sensor and which makes possible the use of pattern recognition algorithms in order to register the movement profile.

In a further embodiment the closing element only is actuated when it is registered by means of the at least one optical sensor that no moving or stationary object is located in a spatial area which would be covered by the closing element during opening or closing.

As the closing element only is actuated when no object is located in the spatial area which the closing element would cover during opening and closing, respectively, it is prevented advantageously that, for example, the authorized operator her-/himself gets caught by a rear lid of the vehicle closing automatically or that, for example, the operator her-/himself is hit during an automatic opening of a door of the motor vehicle. Furthermore, it is prevented that particularly an opening door or lid of the vehicle hits against an obstacle, whereby a damage of the door or lid resulting there from is prevented.

Also according to various embodiments a further method for an automatic actuation of a closing element of a vehicle can be provided. In doing so, the closing element again then automatically is actuated when the following two prerequisites are fulfilled:

A movement of an object in an area surrounding the vehicle corresponding to a predefined movement profile is registered.

At the same time a vehicle key assigned to the vehicle is registered.

In doing so, the movement profile comprises firstly an approach of the object to the vehicle and subsequently a movement of the object away from the vehicle so that the closing element only then is actuated when the movement of the object away from the vehicle is registered.

As the movement profile consists of an approach of the object (for example the operator her-/himself) and a movement of the object away from the vehicle the intention to actuate the closing element (therefore to open or to close) may be recognized or registered better as when the movement profile only would consist of an approach of the object to the vehicle, which sometimes is the case according to prior art. Furthermore, the method according to various embodiments also offers the possibility that the closing element only is actuated when the authorized operator is outside of an area that is covered by the closing element during opening and closing. In doing so, it is assumed that the movement of the object away from the vehicle only then exists when the object is located outside of that area.

According to various embodiments, the approach may be registered in that the object enters a registration area of a sensor (for example a proximity sensor) and that the movement away is registered when the object again leaves the registration area of that sensor.

When the registration area of the sensor is configured such that this registration area at least includes the area which is covered by the closing element during opening or closing it is advantageously ensured that the object initiating the actuation, in particular the authorized operator, is not pinched or hit by the closing element during opening or closing.

According to various embodiments, understood to mean an actuation of a closing element is an opening of that closing element when the closing element is closed, or a closing of the closing element when the closing element is open.

According to various embodiments, a movement profile in conjunction also may comprise an approach of an object (for example the driver), one or more certain movements of this object or of another object (for example a foot gesture with the foot of the driver or a hand gesture with an opened rear lid (i.e. swiping across the optical sensor at the rear lid)) and a subsequent movement away of the object.

According to various embodiments, also provided is a device for actuating a closing element of a vehicle. Thereby, the device comprises a mechanism for actuating the closing element, a control unit, at least one capacitive sensor and at least one optical sensor. The control unit thereby then actuates the closing element by means of the mechanism when the device according to various embodiments by means of a coaction of the at least one capacitive sensor and the at least one optical sensor on the one hand registers a movement of an object in an area surrounding the vehicle corresponding to a predefined movement profile and at the same time the control unit registers a vehicle key assigned to the vehicle.

The advantages of the device according to various embodiments substantially correspond to the advantages of the respective method, which is why a repetition is forgone.

According to an embodiment the device comprises a license plate illumination of the vehicle (i.e. a device for illuminating a license plate or a registration plate). In doing so, either the at least one capacitive sensor or the at least one optical sensor is an integral part of the license plate illumination. It is also possible that either the at least one capacitive sensor or the at least one optical sensor is an integral part of the license plate illumination.

With this embodiment it is possible that a sensor electronics by means of which the at least one capacitive sensor and/or the at least one optical sensor are activated, also is used for activating the license plate illumination.

As the sensor electronics at the same time is used to control the at least one capacitive sensor and the at least one optical sensor as well as to activate the license plate illumination, advantageously only one control device is required for the sensors and for the license plate illumination instead of separate control devices, which is more space-saving and more advantageous during the production of the vehicle.

In a further embodiment the closing element is a rear lid of the vehicle. Thereby, the at least one optical sensor is configured such that the at least one optical sensor registers an area behind the vehicle in case of a closed rear lid and an area below the rear lid in case of an open rear lid. Thereby, understood to mean an area behind the vehicle is an area in which, for example, the driver of the vehicle is located when she/he is standing behind the vehicle in a distance of not more than 1 m.

In this embodiment the at least one optical sensor on the one hand may be used with an opened as well as a closed rear lid in order to register at least a part of the movement of the object corresponding to the predefined movement profile. On the other hand, by means of the at least one optical sensor it may be checked with an opened as well as a closed rear lid whether an object is located in an area which is covered by the rear lid during opening and closing, so that the actuation of the rear lid advantageously only is carried out by the device when this is not the case.

According to various embodiments a further device for actuating a closing element of a vehicle can be provided. This device comprises a mechanism for actuating the closing element, a control unit and at least one sensor. Similar to the device already described above the control unit then actuates the closing element by means of the mechanism when on the one hand the device according to various embodiments registers a movement of an object in an area surrounding the vehicle corresponding to a predefined movement profile by means of the at least one sensor and at the same time the control unit registers a vehicle key assigned to the vehicle. Thereby, the movement profile firstly comprises an approach of the object to the vehicle (in particular towards the closing element to be actuated) and subsequently a movement of the object away from the vehicle, so that the control unit only then actuates the closing element when the object has moved away form the vehicle.

In this case as well, the advantages of the device substantially correspond to the advantages of the respective method, so that a repetition is forgone here.

Thereby, the at least one sensor may comprise at least one capacitive sensor and at least one optical sensor, wherein the device particularly is configured such that the device registers the movement corresponding to the predefined movement profile by means of a coaction of the at least one capacitive sensor and the at least one optical sensor. For example, it is possible that the at least one optical sensor is activated by the at least one capacitive sensor when on the one hand the vehicle key assigned to the vehicle has been registered and on the other hand the at least one capacitive sensor has registered the approach of the object.

At last, according to various embodiments a vehicle can be provided comprising one of the above described devices.

The various embodiments in particular are adapted for an automatic actuation of a door or lid of a vehicle. Of course, the present invention is not limited to this preferred range of application. For example, the present invention may also be applied to actuate a window or a sliding roof of the vehicle.

Furthermore, the present invention may also be applied in airplanes, ships or railmounted vehicles.

Figure 1:
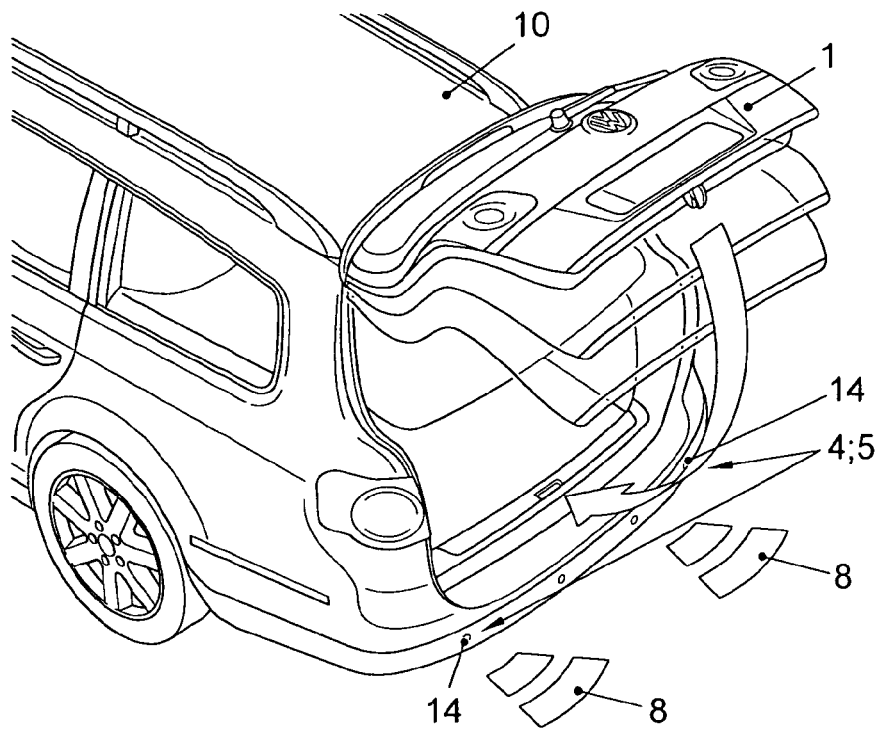
FIG. 1 shows a vehicle according to various embodiments comprising an automatically actuated rear lid shown in open position.

Shown in FIG. 1 is a first embodiment of a vehicle 10, in which a rear lid 1 of the vehicle 10 may be actuated automatically. Thereby, a capacitive sensor 5 and an optical sensor 4 each are located in two rear reflectors 14 at the rear end of the vehicle 10. A registration area 8 of the respective optical sensor 5 covers an area behind the vehicle 10, which is located to the right and to the left, respectively, of a center axis (in driving direction) of the vehicle 10.

In the following, operations will be described that are carried out in the sequence shown before the closing element, in this case a rear lid 1, is actuated.

1. One of the capacitive sensors 5 has registered a movement of an object in the direction of the rear reflector 14 into which it is integrated. In other words, the respective capacitive sensor 5 has registered that an object, which before was located outside of its registration area, now has moved inside its registration area. This operation will be designated as "inward completed".

2. By means of a control unit 2 (see FIG. 4) an authentication of an ID encoder authorized for the vehicle 10 is initiated, as this is the case in vehicles equipped with keyless entry systems. When, in doing so, no authorized ID encoder is registered, no further operation is being processed ("break action") and the closing element 1 is not actuated.

3. When a valid ID encoder has been registered, the optical sensor 4 is activated. In doing so it is possible that only the optical sensor 4 is activated that is integrated into the same rear reflector 14 or that both optical sensors 4 are activated.

4. By means of the optical sensor 4 the movement registered by the capacitive sensor 5 is verified ("compare movement"). When the data of the optical sensor 4 do not conform to the data of the capacitive sensor 5 (for example, when the capacitive sensor 5 registers an approach, but the optical sensor 4 does not register an approach) no further operation is processed ("break action") and the closing element is not actuated.

5. Further movements of the object are registered and evaluated by the at least one optical sensor 4. When the at least one optical sensor 4 does not register the complete movement corresponding to the predefined movement profile during a predefined time frame no further operation is processed ("break action") and the closing element 1 is not actuated.

6. The registration areas 8 of the optical sensors 4 are scanned by means of the optical sensors 4 (at the latest from here both optical sensors 4 should be activated), wherein these registration areas 8 comprise an area that is covered by the closing element 1 during opening. When, after a predefined time interval, there are still objects located in one of the registration areas 8, such as the driver of the vehicle 10, no further operation will be processed ("break action") and the closing element 1 is not actuated.

7. The closing element 1 is opened ("open trunk"), wherein still the registration areas 8 of the optical sensor 4 are scanned. When an object entering one of the registration areas 8 is registered during the opening of the closing element 1, the opening is aborted ("break action").

In the above described embodiment the closing element 1 thus is only actuated when on the one hand a movement of an object corresponding to the predefined movement profile has been registered and when on the other hand after the registration of this movement no object is registered in one of the registration areas 8 of the optical sensors 4. Thereby, the movement of the object for example consists of a foot or a lower leg of the driver of the vehicle, which in the form of a first movement is moved under the vehicle (below one of the two capacitive sensors 5 and therefore one of the two optical sensors 4) and which subsequently in the form of a second movement again is retracted behind the vehicle 10 into an initial position. Of course, the movement of the object away from the registration areas of the optical sensors 4 such that there is no object located in one of the registration areas 8 of the optical sensors 4, may also be understood to be an integral part of the movement profile.

Depicted in FIG. 2 is a further embodiment of a vehicle 10 for automatic actuation of a closing element or a rear lid 1, respectively. Thereby, a capacitive sensor 5, a first optical sensor 4 and a second optical sensor 7 are arranged in a license plate illumination of the vehicle 10. In doing so, the first optical sensor 4 is used during opening the rear lid 1 and the second optical sensor 7 is used during closing the rear lid 1. In a closed rear lid 1 the first optical sensor 4 is aligned such that it covers a registration area behind the vehicle 10 as shown in FIG. 3. In contrast, in an opened rear lid 1 the second optical sensor 7 is aligned such that it covers a registration area 8 below the opened rear lid 1.

Depicted in FIG. 3 is the vehicle 10 shown in FIG. 2 with the rear lid 1 in closed position. The capacitive sensor 5 and the first optical sensor 4 are configured such that their registration area covers an angular range 9 of 10° to 30°. In doing so, the angular range 9 extends from an arm of the angle 9 extending downward in perpendicular direction from the capacitive sensor 5 or from the optical sensor 4 to an arm of the angle 9 extending to the rear from the vehicle 10 opposite to the driving direction. Generally, the optical sensor in particular consists of several LEDs as receivers of optical radiation, which are aligned in the direction of the opening area of the rear lid 1 in this embodiment.

Depicted in FIG. 4 is a vehicle 10 according to various embodiments, which comprises a rear lid 1 as closing element and a device 12 according to various embodiments. The device 12 on its part comprises a license plate illumination 13, a control unit 2 and a mechanism 3 for opening and for closing the rear lid 1. Arranged in the license plate illumination 13 are a capacitive sensor 5 and an optical sensor 4, which are activated by sensor electronics 11, which also is arranged in the license plate illumination 13 and besides the sensors 4, 5 also controls the license plate illumination 13 itself.

In order to open the rear lid 1 the driver carrying a key 6 authorized for the vehicle 10 approaches the license plate illumination 13, which is registered by the capacitive sensor 4. Via the sensor electronics 11 the control unit 2 is informed, which then scans for the vehicle key 6 authorized for the vehicle 10. When the control unit 2 registers the vehicle key 6 authorized for the vehicle 10, the optical sensor 5 is activated via the sensor electronics 11. When the optical sensor 4 registers that the driver is leaving the registration area of the optical sensor 4 the sensor electronics 11 informs the control unit 2, which opens the rear lid 1 via the mechanism 3.

What is claimed is:

1. A method for automatically actuating a closing element of a vehicle, the method comprising:
    detecting a movement of an object in an area surrounding the vehicle using at least one capacitive sensor,
    detecting a vehicle key assigned to the vehicle,
    only after detecting the movement of the object using the at least one capacitive sensor, automatically activating at least one optical sensor, and
    determining, using the at least one activated optical sensor, whether a continued movement of the object in the area surrounding the vehicle corresponds to a predefined movement profile, and
    automatically actuating the closing element of the vehicle in response to both (a) detecting the vehicle key assigned to the vehicle and (b) determining, using the at least one activated optical sensor, that the continued movement of the object corresponds to the predefined movement profile.

2. The method according to claim 1, wherein the least one optical sensor is only activated when the at least one capacitive sensor has detected a part of the movement corresponding to the predefined movement profile and the key assigned to the vehicle has been detected.

3. The method according to claim 1, wherein the closing element is only actuated when it is determined by the at least one optical sensor that no object is located in an area which is covered by the closing element during opening or closing.

4. A method for automatically opening a closing element of a vehicle, the method comprising:
    detecting a movement of an object in an area surrounding the vehicle corresponding to a predefined movement profile, and
    at the same time as detecting the movement of the object, detecting a vehicle key assigned to the vehicle,
    wherein the predefined movement profile defines an approach to the vehicle and a subsequent movement away from the vehicle, and
    automatically opening the closing element of the vehicle only after (a) detecting the vehicle key assigned to the vehicle and (b) detecting the subsequent movement away from the vehicle defined by the predefined movement profile.

5. The method according to claim 4, wherein the approach to the vehicle is detected when the object enters a registration area of at least one sensor, and the movement away from the vehicle is detected when the object leaves the registration area of the at least one sensor.

6. The method according to claim 1, wherein the closing element is a door or a lid of the vehicle.

7. A device for actuating a closing element of a vehicle, the device comprising:
   a mechanism for actuating the closing element,
   a control unit configured to detect a vehicle key assigned to the vehicle,
   at least one capacitive sensor configured to detect a movement of an object in an area surrounding the vehicle, and
   at least one optical sensor configured to detect a continued movement of the object in the area surrounding the vehicle, wherein the at least one optical sensor is automatically activated only after detecting the movement of the object using the at least one capacitive sensor, and
   wherein the device is configured to:
      determine whether the continued movement of the object corresponds to a predefined movement profile, and
      automatically actuate the closing element of the vehicle in response to both (a) detecting the vehicle key by the control unit and (b) determining that the continued movement of the object detected by the at least one optical sensor corresponds to the predefined movement profile.

8. The device according to claim 7, wherein:
   the device comprises a license plate illumination of the vehicle, and
   at least one of the at least one capacitive sensor and the at least one optical sensor is integrated into the license plate illumination.

9. The device according to claim 8, wherein:
   the device comprises sensor electronics configured to:
      activate the at least one capacitive sensor and the at least one optical sensor, and
      activate the license plate illumination.

10. The device according to claim 7, wherein:
    the closing element is a rear lid of the vehicle, and
    the at least one optical sensor is configured such that the optical sensor senses an area behind the vehicle when the rear lid is closed and the at least one optical sensor senses an area below the rear lid when the rear lid is open.

11. The device according to claim 7, wherein the least one optical sensor is only activated when the at least one capacitive sensor has detected a part of the movement corresponding to the predefined movement profile and the key assigned to the vehicle has been detected.

12. A device for automatically opening a closing element of a vehicle, the device comprising:
    a mechanism for opening the closing element,
    a control unit configured to detect a vehicle key assigned to the vehicle, and
    at least one sensor configured to detect a movement of an object in an area surrounding the vehicle,
    wherein the device is configured such that the control unit:
       determines whether the movement of the object in the area surrounding the vehicle corresponds to a predefined movement profile that defines both an approach to the vehicle and a subsequent movement away from the vehicle, and
       controls the mechanism to open the closing element of the vehicle only after (a) the control unit detects the vehicle key assigned to the vehicle and (b) the at least one sensor detects the subsequent movement away from the vehicle defined by the predefined movement profile.

13. The device according to claim 12, wherein the at least one sensor comprises a capacitive sensor and an optical sensor and the device is configured such that the device detects the movement of the object by a cooperation of the capacitive sensor and the optical sensor.

14. The device according to claim 12, wherein the approach to the vehicle is detected when the object enters a registration area of at least one sensor, and the movement away from the vehicle is detected when the object leaves the registration area of the at least one sensor.

15. The device according to claim 12, wherein the closing element is a door or a lid of the vehicle.

* * * * *